United States Patent
Wang et al.

(10) Patent No.: US 8,311,015 B2
(45) Date of Patent: Nov. 13, 2012

(54) METHOD FOR SUPPORTING CONTINUOUS RECEPTION OF EVOLVED BROADCAST AND MULTICAST SERVICE DATA

(75) Inventors: Hong Wang, Beijing (CN); Xiaoqiang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 298 days.

(21) Appl. No.: 12/680,395

(22) PCT Filed: Sep. 16, 2008

(86) PCT No.: PCT/KR2008/005443
§ 371 (c)(1),
(2), (4) Date: Mar. 26, 2010

(87) PCT Pub. No.: WO2009/045006
PCT Pub. Date: Apr. 9, 2009

(65) Prior Publication Data
US 2010/0254352 A1    Oct. 7, 2010

(30) Foreign Application Priority Data

Sep. 29, 2007    (CN) .......................... 2007 1 0164105

(51) Int. Cl.
*H04W 36/00*    (2009.01)
(52) U.S. Cl. ........................................ 370/331; 370/432
(58) Field of Classification Search .................. 370/329, 370/331, 332, 338, 390, 432
See application file for complete search history.

(56) References Cited

U.S. PATENT DOCUMENTS

| | | | |
|---|---|---|---|
| 2003/0231612 A1* | 12/2003 | Kim et al. | 370/342 |
| 2004/0219901 A1* | 11/2004 | Loke | 455/318 |
| 2005/0237972 A1* | 10/2005 | Van Dervelde et al. | 370/329 |
| 2006/0058034 A1* | 3/2006 | Vaittinen et al. | 455/450 |
| 2006/0067353 A1* | 3/2006 | Pekonen et al. | 370/432 |
| 2008/0259843 A1* | 10/2008 | Cai | 370/328 |
| 2008/0273468 A1* | 11/2008 | Cai | 370/242 |

FOREIGN PATENT DOCUMENTS

| | | |
|---|---|---|
| EP | 1691508 A1 | 8/2006 |
| EP | 1773090 A1 | 4/2007 |

* cited by examiner

*Primary Examiner* — Brian D Nguyen
(74) *Attorney, Agent, or Firm* — The Farrell Law Firm, P.C.

(57) ABSTRACT

The method for supporting continuous reception of enhanced broadcast service data comprising steps of: an MCE receiving an "MBMS Session Start Request" message from a core network; after the MCE receives the message, transmitting a response message to the core network; MCE transmitting an "MBMS Session Start Request" message to an ENB, the message including information of adjacent cells; and the ENB broadcasting the information of adjacent cells on a current cells. With the scheme of present invention, if a user wants to move to a common cell when he/she receives MBMS service in an SFN edge cell, he/she can enter the active mode and switch into the common cell so as to reduce MBMS data loss. When a UE moves from a cell with SC-PTM transmission mode into a cell with SC-PTM transmission mode, data loss can also be reduced.

16 Claims, 7 Drawing Sheets

METHOD FOR SUPPORTING CONTINUOUS RECEPTION OF EVOLVED BROADCAST AND MULTICAST SERVICE DATA

TECHNICAL FIELD

Present invention relates to long-term evolution communication, especially to a method for supporting continuous reception of broadcast and multicast service data when a UE moves between different type of cells.

BACKGROUND ART

Mobility Management Entity (MME) and User Plane Entity (UPE) in an enhanced radio communication system can be combined in a same entity, where a plurality of MMEs/UPEs are connected to a plurality of ENBs and one ENB is connected to an adjacent ENB. In a communication system, MME and UPE may be two separate entities. Here, a system structure is shown in FIG. 1. More than one MMEs are connected to ENBs through S1 interface, a plurality of UPEs are connected to many ENB through S1 interface, and one ENB is connected to the adjacent ENB through X2 interface. With reference to FIG. 1, a radio communication system contains a communication trunk network 100, a group of enhanced base stations E-Node B 104 and 105, and they jointly provide services within the route area TA. Radio communication system could be, but not limited to FDMA based communication system, TDMA based communication system or CDMA based communication system. Communication trunk network 109 contains MME (mobility management entity) 103 and UPE (user plane entity) 102. Each enhanced base station 104 and 105 provides services for all communication cell 106 and 107 in a whole route area. MME103, UPE102 and E-Node B 105, complying with a practically executable standard, provide radio communication services for cell phones 108 working within the communication cell (MS), UPE102 and Anchor101 are connected, to receive the data sent by the external network from Anchor. The system components mentioned above are expected to be purchased commercially.

To make efficient use of air interface resources, some service is provided to the users in form of Multimedia Broadcast and Multicast Service (MBMS service). Each MBMS service provides services within its own service area. For each cell in the serving area, a dedicated control MCCH is adopted to transmit MBMS signaling.

In an enhanced radio communication system, some differences exist between an MBMS transmission mode and 3G. MBMS service may be transmitted in a single-carrier cell. If the same single-carrier is adopted for the transmission of MBMS service in adjacent cell and the synchronization is applied here, then the signal received by the user is superposition of the two signals. If the same MBMS service is transmitted with the same carrier but in non-synchronous mode in adjacent cells, then signals from adjacent cells cause interferences to the user and therefore MBMS receiving quality for user is affected. Thus, a continuous area is defined for an enhanced radio communication system. Within this area, all enhanced base stations share one carrier to synchronously transmit signals so as to improve the MBMS receiving quality of the user. This continuous area is called an SFN area.

Single Frequency Network (SFN) area includes cells with continuous geographical areas, these cells use the same radio resources to synchronize the transmission of a particular MBMS service. SFN area is an only service area that belongs to MBMS. One SFN area contains only the cell that is transmitting data.

MBMS service area is a specific area for MBMS Session data transmission. Multi-cell MBMS synchronization area is a group of cells, which cover a continuous area and allocate the same frequency band to MBMS service. The group of cells are able and possible to transmit MBMS data through SFN model. Multi-cell MBMS synchronization does not rely on MBMS service area, and a multi-cell MBMS synchronization area can support one or more SFN areas. For a geographical area, a designated frequency band defines only one multi-cell MBMS synchronization area. If many a multi-cell MBMS synchronization area is defined for the same geographic area, these multi-cell MBMS synchronization areas will be allocated to different frequency bands.

A multi-cell MBMS synchronization area can contain a plurality of SFN areas. To reduce interference, the adjacent SFNs must not use the same frequency.

Research shows all the enhanced base station synchronization transmitting MBMS data will bring about significant improvement in performance. There are different technologies to achieve data synchronization transmission between enhanced base stations. One is the synchronization method by the network, where the transmission network achieves synchronization with a clock, using IEEE1588 protocol. This protocol can coordinate a series of clocks at the enhanced base station, and the synchronization occurs among them, with precision being at least several microseconds. One method is through a public satellite signal, for example GPS, to transmit the synchronization signal to the enhanced base station. Another method is synchronization of air interface signal assisted by UE, and a great deal of air resources will be wasted by this method. And the detailed approach is not determined at all. Whichever approach is applied here, it aims at that the signal from the enhanced base station is synchronous so as to gain the best performance.

The MBMS data is received from the enhanced base station synchronistically, thus not only synchronization of the enhanced base station, but also the same data packets sent by the enhanced base station are desired. Therefore UE can jointly receive the signals sent by different enhanced base stations. To ensure that the data packets sent by the enhanced base station are the same, it is necessary that the enhanced base stations have the same data processing link, so that a centralized control node is needed to configure a data processing link with the enhanced base station. For example, the same RLC/MAC protocol parameter to the enhanced base station is configured. Hereinafter, a physical entity where a control module is located is called as MCE, and MCE will set the same RLC/MAC configuration for the enhanced base station within the SFN scope.

FIG. 2 shows a structure of EMBMS where MCE is a new node. MCE not only configures the SFN area but also schedules MBMS.

Cells under the coverage of SFN may be divided into three types with one is called as a transmission and announcement cell, one is called as an only transmission cell, and the rest are called as reserved cells. In the transmission and announcement cell, both control channel and data channel for eMBMS are transmitted. In the only transmission cell, only data is transmitted. And in the reserved cell, neither control channel nor data is transmitted. Resources for SFN transmission may be allocated to other services. Within the SFN coverage, a multi-cell point-to-multipoint (MC-PTM) mode, i.e., an SFN transmission mode, is adopted to transmit eMBMS data.

The cells that do not belong to the SFN coverage are common cells. And in a common cell, the single-cell point-to-multipoint (SC-PTM) transmission mode is applied.

When a user moves from a cell with the MC-PTM transmission mode into a cell with the SC-PTM transmission mode, if the user is in idle state, it is necessary to re-select a cell. And if it is a first user, it is necessary for ENB to establish a data connection with a core network. During this process, loss of data happens.

It is necessary to consider how to maintain continuous data receiving when a user moves from MC-PTM cell to either a reserved cell or an only transmission cell.

DISCLOSURE OF INVENTION

Technical Problem

In the prior art, a solution is to broadcast an edge cell indicator from an edge cell of SFN. With this indicator, the user obtains that he/she arrives at the edge cell. And the user in idle state switches into a connection mode once he/she enters the edge cell in the SFN area. And MEC may determine to transmit data to the user through SC-PTM mode. However, a disadvantage of this solution is that, if the user does not move, or he/she moves from the edge cell to a cell within the SFN coverage, it is not necessary for UE to maintain the connection mode to receive data. If this edge cell has many users, they are enforced to enter the connection mode. This is not necessary.

Technical Solution

The object of this invention is to provide a method for supporting continuous reception of enhanced broadcast service data. With this method, a connection mode is switched in advance once any of users moves to a common cell.

To achieve the object mentioned above, a method for supporting continuous reception of enhanced broadcast service data comprising steps of:

an MCE receiving an "MBMS Session Start Request" message from a core network;

after the MCE receives the message, transmitting a response message to the core network;

MCE transmitting an "MBMS Session Start Request" message to an ENB, the message including information of adjacent cells; and the ENB broadcasting the information of adjacent cells on a current cell.

If a user wants to move to a common cell when he/she receives MBMS service in an SFN edge cell, according to present invention, he/she can enter the active mode and switch into the common cell so as to reduce MBMS data loss. When a UE moves from a cell with SC-PTM transmission mode into a cell with SC-PTM transmission mode, data loss can also be reduced.

BRIEF DESCRIPTION OF THE DRAWINGS

The above and other objects, features and advantages of certain exemplary embodiments of the present invention will be more apparent from the following detailed description taken in conjunction with the accompanying drawings, in which.

BEST MODE FOR CARRYING OUT THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention disclose an apparatus and a method for providing a service for user convenience in using a mobile terminal. For example, the present invention provides a mobile terminal having a dual liquid crystal display (hereinafter, LCD), and enables display of additional functions desired by the user through one or two LCDs by using the dual LCD.

Although the LCD is described as an example of a display unit according to exemplary embodiments of the present invention, the present invention is not limited thereto.

The present invention provides an automatic changeover between two LCDs by using a sensing unit in a mobile terminal having a dual LCD, and automatic display of additional function screens on the corresponding LCD.

For example, when the front surface of the mobile terminal is formed as a conventional phone face and the rear surface is formed as a MP3 face, the LCD of the front surface (that is, phone screen) and the LCD of the rear surface (that is, MP3 screen) are automatically displayed according to operation of the sensing unit. Additionally, the LCDs of the front and rear surfaces are automatically switched on/off corresponding to a function desired by the user. In this example, the mobile terminal may have various forms including an MP3 face corresponding to additional functions to be utilized in the mobile terminal.

Although a mobile terminal is hereinafter described as an example for convenience in explanation, the present invention is not limited thereto. The mobile terminal according to the exemplary embodiments of the present invention is a terminal for providing user convenience. The terminal for providing user convenience may be information and communication equipments, such as a mobile terminal, mobile phone, wired/wireless telephone, smart phone, International Mobile Telecommunication 2000 (IMT-2000) terminal, and Universal Mobile Telecommunication Service (UMTS) terminal, and their applications.

Mode for the Invention

Figure 1:
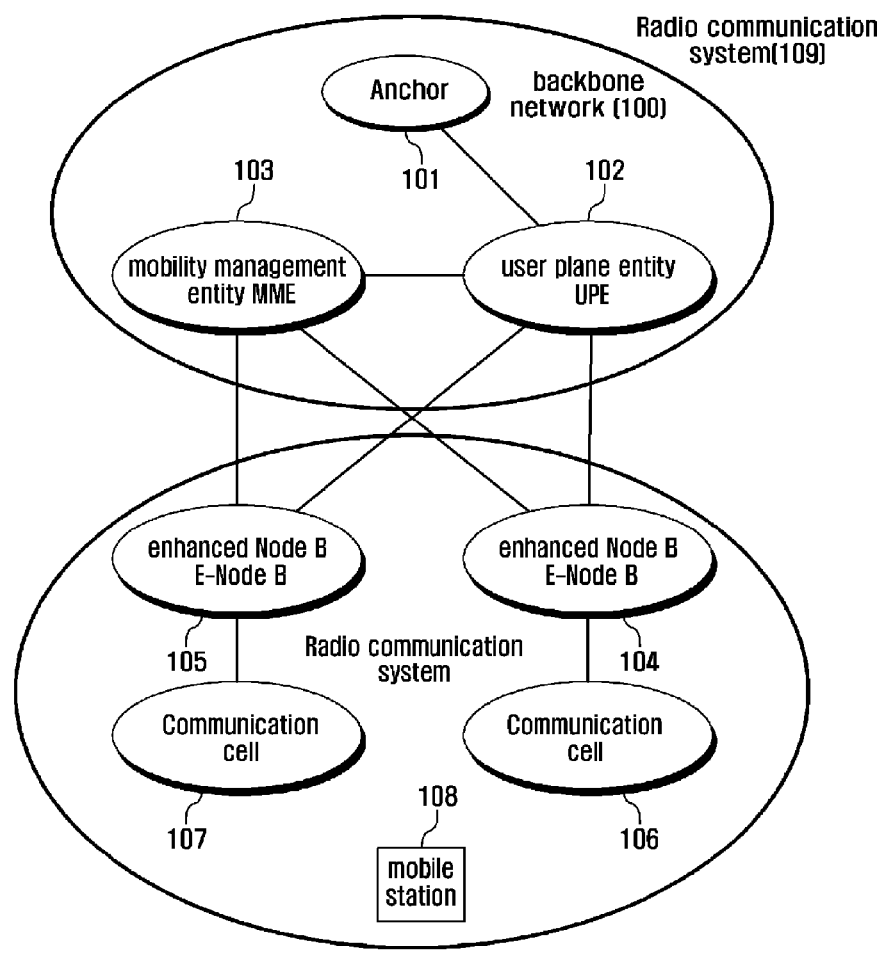
FIG. 1 shows a block diagram of a radio communication system according to present invention.
Figure 2:
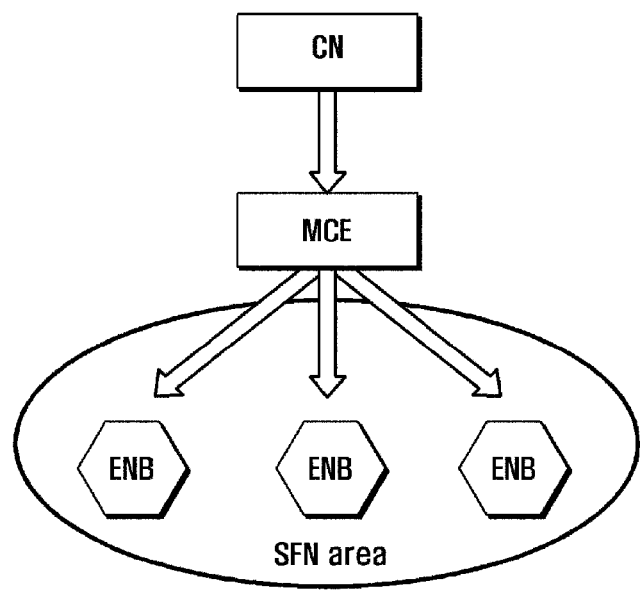
FIG. 2 shows a structure of the system according to present invention.
Figure 3:
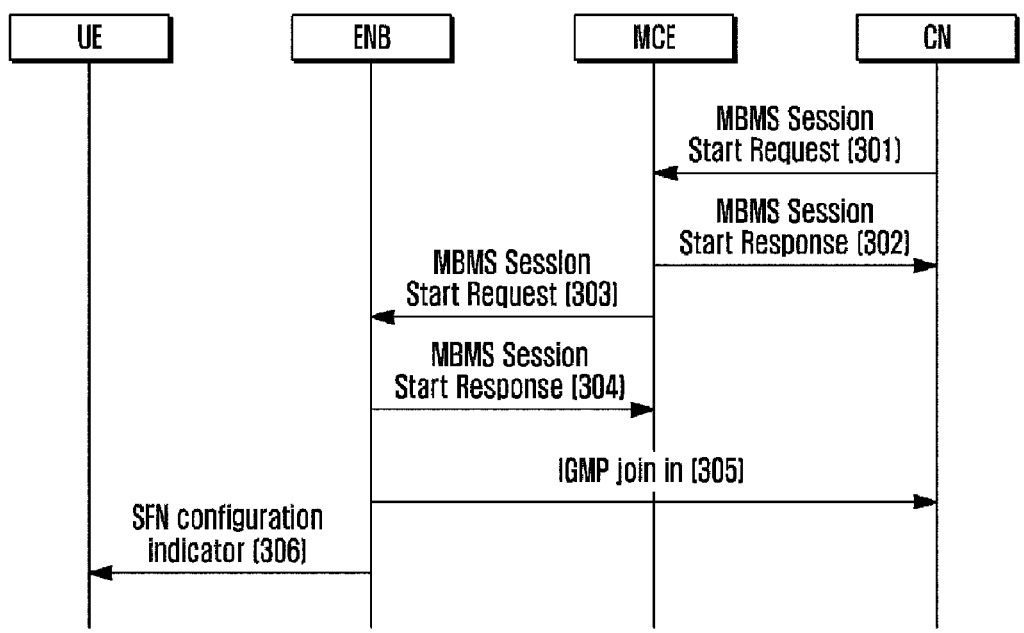
FIG. 3 illustrates an embodiment 1 according to present invention.

Embodiment 1 of present invention is shown in FIG. 3. The detailed description is given with reference to this figure. And detailed technical description that is well known is omitted in the following.

In Step 301, MCE receives an "MBMS Session Start Request" message from a core network, which is a logic entity including a user plane and a control plane. From the point of view of RAN, the user plane and the control plane are called as the core network. The message in this step contains information such as an identifier of service, service type of service bearer, parameters of the radio access bearer, serving range of the service, start time of the service, initial area for MBMS SFN and address of the user plane which transmits the MBMS data.

The service type of service bearer may be set as "broadcast service" or "enhanced broadcast service". RAB parameters include all properties for RAB such as the maximum transmission rate, the maximum length of SDU, etc. The serving range of service includes a list of serving range identifiers with each being mapped to one cell or more.

In Step 302, after receiving this message, the MCE transmits a response message to the core network.

In Step 303, MCE determines radio resource configuration to be applied in the SFN coverage, such as configuration information of frequencies for using, time resource block, and RLC/MAC. MCE transmits an "MBMS Session Start Request" message to a cell within the initial SFN coverage, including parameters of 301 message, as well as configuration information of the radio resources applied in the SFN coverage, and the address of the user plane for MBMS data transmission. The address of the user plane is just an address of the network node through which MBMS data is transmitted. It is obtained by MCE from the network in step 301. This message also includes information of adjacent cells. The information of adjacent cells contains the attribute of the adjacent cells and the information with which to uniquely distinguish the adjacent cells apart from one another. Optionally, this message also contains measurement information, which contains channels to be measured by UE, parameters to be measured, and threshold for determining whether UE enters the connection mode or not.

Information of adjacent cells further contains the attribute of adjacent cells, the information (e.g., the identifier of the applied primary scramble code) of codes for uniquely distinguishing the adjacent cell. The attribute of a cell is on the point of view of MBMS. Under the SFN mode, cells in the range of SFN are divided into three types: one is called as the transmission and announcement cell, one is called as the only transmission cell, and the rest is called as the reserved cell. In present invention, the cells out of the coverage of SFN are called common cells. In a common cell, not the SFN transmission mode but SC-PTM is applied. Radio resources are configured by ENB for SC-PTM. The attribute of adjacent cells indicates whether the cell is a common cell or not. In present invention, once an adjacent cell is indicated to be a common cell or a cell within the coverage of SFN, the method proposed in present invention can be applied. However it is possible to indicate the type of a cell within the coverage of SFN in detail.

For example, information of adjacent cells mainly includes:

an identifier of the primary scramble code of an adjacent cell
  attribute of adjacent cells: the common cell.

In Step 304, ENB transmits an "MBMS Session Start Response" message to MCE.

In Step 305, ENB transmits a message to an address of the corresponding user plane according to the received user plane address in MBMS data, for requesting to join in a receiving group of the user plane. This message may be transmitted by means of an existing multicast command, that is, an IGMP joining in command.

Figure 5:
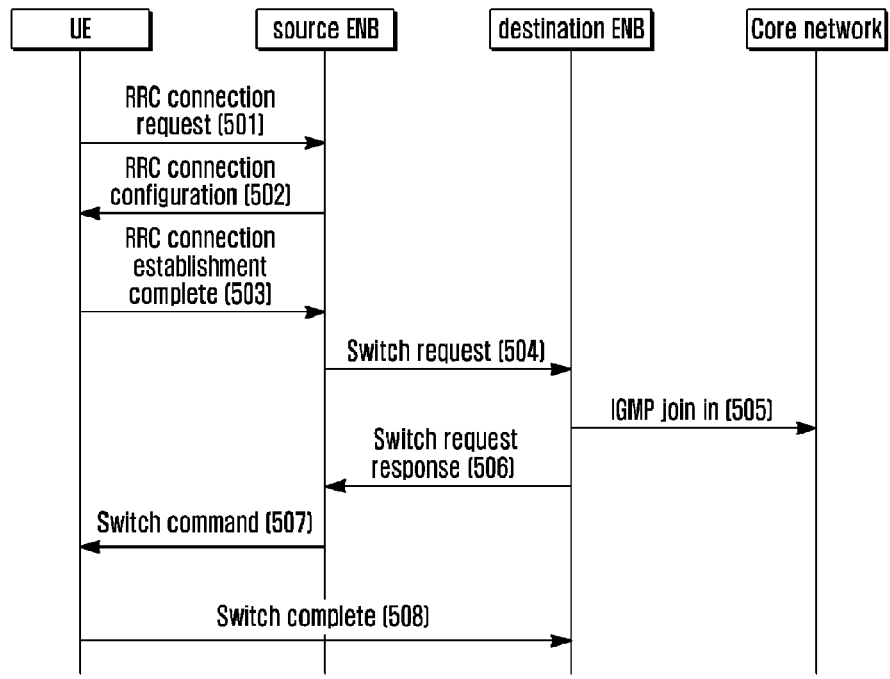
FIG. 5 illustrates an embodiment 3 according to present invention.
Figure 6:
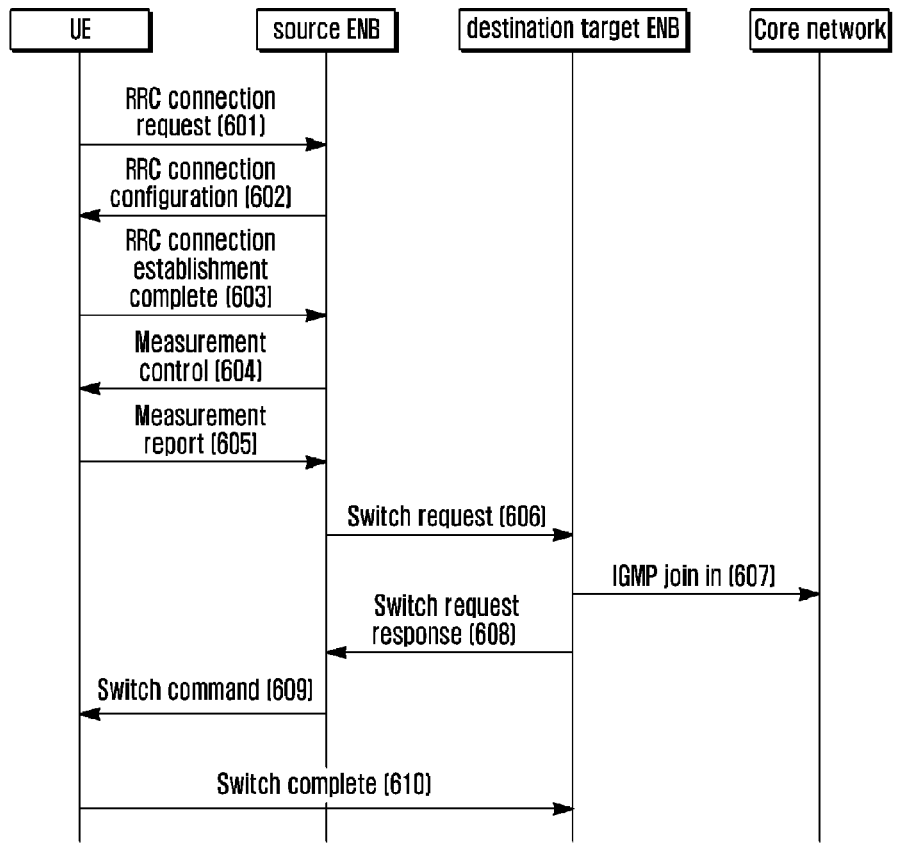
FIG. 6 illustrates an embodiment 4 according to present invention.
Figure 7:
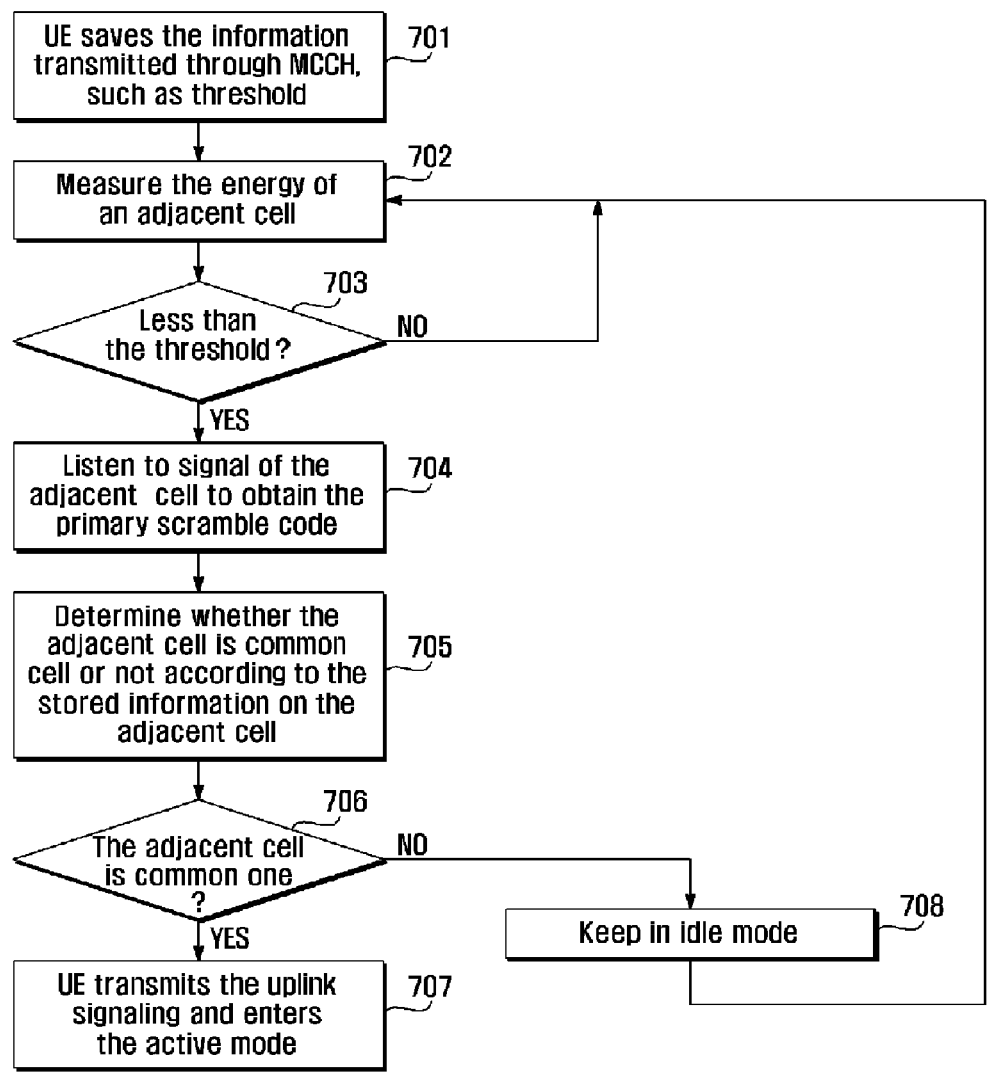
FIG. 7 shows an example 1 of an operation of UE in present invention.

In Step 306, ENB transmits MBMS control information on MBMS control channel MCCH. The control information contains information such as a service identifier of the MBMS, flag for indicating start of MBMS, and the radio resource for MBMS. The information of adjacent cells and the measurement information are also included. The measurement information contains the channel needed to be measured by UE, the parameters needed to be measured, i.e., the measurement information indicates to measure the power of the MCCH, and the threshold with which UE judges whether it enters the connection mode or not. This measurement information can be either transmitted from MCE in step 303, or determined by ENB. By the comparison between the measurement result and the threshold, UE obtains that it has moved to the edge of the cell. Several approaches may be applied to generate this threshold. For example, the threshold may be a receiving energy threshold for MCCH, a receiving energy threshold for MTCH, an energy threshold of pilot channel for the cell, or an energy threshold of pilot channel for the adjacent cell. UE saves those control information after receiving. The operation of UE is shown in FIGS. 5 through 7.

Figure 4:
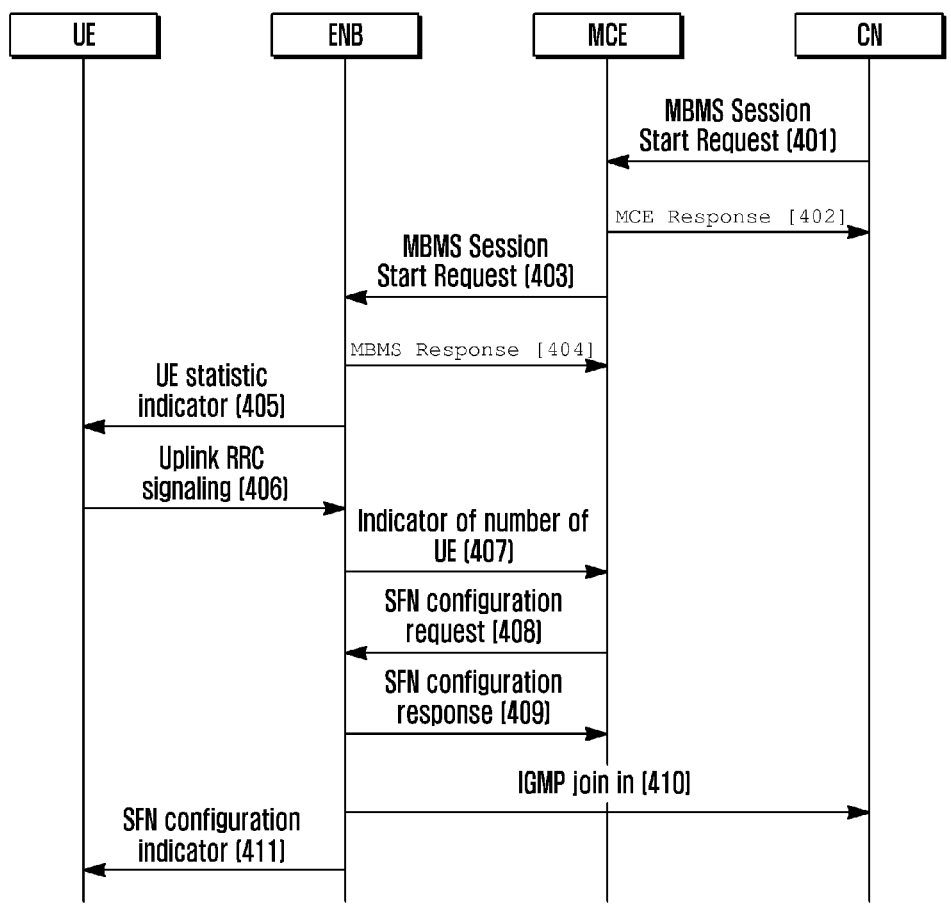
FIG. 4 illustrates an embodiment 2 according to present invention.

Embodiment 2 of present invention is shown in FIG. 4. The detail is given with reference to this figure. Detailed technical description which is well known is omitted.

In Step 401, MCE receives the "MBMS Session Start Request" message from the core network, which is a logic entity including the user plane and the control plane. From the point of view of RAN, the user plane and the control plane are united to be the core network. The message in this step includes information such as the identifier of service, the service type of service bearer, the parameters of the radio access bearer, the serving range of service, the start time of service and the address of the user plane of the MBMS data. The address of this user plane is the address of the network node for MBMS data transmission.

The service type of service bearer may be set as "broadcast service" or "enhanced broadcast service". RAB parameters contain all QoS related properties such as the maximum transmission rate, the maximum length of SDU, etc. The serving range of service contains a list of serving range identifiers with each being mapped to one or more cells.

In Step 402, After receiving this message, the MCE transmits the response message to the core network.

In Step 403, MCE transmits the "MBMS Session Start Request" message to all cells within the initial SFN coverage, including the parameters of 401 message, as well as information for requesting the ENB to counting a number of UEs. For example, the information contains an indicator for counting UE, a cycle period of UE counting. ENB implements a UE counting process right after it receives the indicator for counting UE. ENB receives the cycle period of UE counting. The UE counting process is implemented according to the received cycle period of UE counting and reports the result to MCE. MCE as well can transmit the message of step 403 to all cells within the serving range. Optionally, this message also contains the measurement information, which contains the channels to be measured by UE, the parameters to be measured, and the threshold with which to determine whether UE enters the connection mode or not.

In Step 404, ENB transmits the "MBMS Session Start Response" message to MCE.

In Step 405, ENB transmits an MBMS UE counting indicator on the MBMS control channel MCCH.

In Step 406, The UE who is interested in this service transmits the uplink signaling, including the identifier of the service that the UE is interested in.

In Step 407, ENB counts a number of UEs and informs MCE of the counting result by mean of the message of step 407. In this message, information of the cell, e.g., the applied primary scramble code, is included. Also, step 404 and step 407 can be combined together. After ENB completes the process of UE counting, it transmits the "MBMS Session Start Response" message. And in this message, information mentioned in step 403 and step 407 is included.

In Step 408, MCE determines the SFN range and attributes for each cell according to the number of UEs counted in each cell. MCE transmits a command to the cells within the SFN coverage to configure radio resources for data transmission within the SFN coverage. This message contains information such as the identifier of the service, the attribute of the cells, the configuration of SFN, and the information of adjacent cells.

Information of adjacent cells contains the attribute of adjacent cells, the information (e.g., the identifier of the applied primary scramble code) on the code for uniquely distinguishing the adjacent cell. The attribute for a cell is on the point of view of MBMS. Under the SFN mode, cells in the range of SFN are divided into three types: one is called as the transmission and announcement cell, one is called as the only transmission cell, and the rest is called as the reserved cell. And in present invention, the cells out of the coverage of SFN are called common cells. In a common cell, not the SFN transmission mode but SC-PTM is applied. Radio resources are configured by ENB for SC-PTM. The attribute of adjacent cells indicates whether the cell is a common cell or not. In present invention, once an adjacent cell is indicated to be a common cell or a cell within the coverage of SFN, the method proposed in present invention may be applied. However it is possible to indicate the type of a cell within the coverage of SFN in detail.

For example, information of adjacent cells primarily contains:

the identifier of the primary scramble code of an adjacent cell the attribute of adjacent cells: the common cell.

In Step 409, ENB transmits the response message to MCE.

In Step 410, ENB transmits a message to the address of the corresponding user plane according to the received user plane address in MBMS data, for requesting to join in the receiving group of the user plane. This message may be transmitted by mean of existing multicast command, that is, the IGMP joining in command.

In Step 411, ENB transmits MBMS control information through MBMS control channel MCCH. The control information contains information such as the service identifier of the MBMS, the flag for indicating start of MBMS, the radio resource for MBMS, and the information of adjacent cells and the measurement information. The measurement information contains the channel needed to be measured by UE, the parameters needed to be measured, i.e., the measurement information indicates to measure the power of the MCCH, and the threshold with which UE determines whether it enters the connection mode or not. This measurement information may be either transmitted from MCE in step 403, or specified by ENB. By the comparison between the measurement result and the threshold, UE knows that it has moved to the edge of the cell. Several approaches may be applied to generate this threshold. For example, the threshold may be the receiving energy threshold of MCCH, the receiving energy threshold of MTCH, the energy threshold of pilot channel for the cell, and the energy threshold of pilot channel for the adjacent cells. UE saves this information and utilizes these parameters according to following operation explanations.

Embodiment 3 of present invention is shown in FIG. 5. The detail is given with reference to this figure. Detailed technical description which is well known is omitted.

In Step 501, UE implements a measurement process according to the measurement information sent from ENB. The options of UE are illustrated in FIGS. 7 through 10. According to the illustration of operations, if it is necessary for UE to enter into an active state, the UE transmits a message 501 and an RRC connection request, including the identifier of UE, the identifier of PLMN, the capability of UE, and reason for establishment. Optionally, this message contains the MBMS measurement result, which is measured according to the measurement information of the MCCH broadcast. For example, the information of the MCCH broadcast is used to measure the energy of the pilot in an adjacent cell. Then the measurement result contains the measurement of the pilot energy for adjacent cell. Optionally, this message contains an indicator, indicating the reason for the establishment of RRC connection is that the measured signal is lower or higher than the threshold, and then UE wants to switch into the destination cell. Optionally, this message contains the identifier of the measured cell.

In Step 502, ENB transmits the "RRC connection configuration" message. This message contains the configurations on the radio resources and the configurations on measurement.

Step 503, UE transmits the "RRC connection complete" message. Optionally, this message contains the MBMS measurement result, which is measured according to the measurement information of the MCCH broadcast. For example, the information of the MCCH broadcast is to measure the energy of the pilot in an adjacent cell. Then the measurement result contains the measurement of the pilot energy for the adjacent cell. Optionally, this message contains an indicator, indicating that the reason for the establishment of RRC connection is that the measured signal is lower or higher than the threshold, and then UE wants to switch into the destination cell. Optionally, this message contains the identifier of the measured cell.

In Step 504, a source cell transmits a "switch request" message to a destination cell. This message contains the identifier of the UE, the identifier of the MBMS service in which the UE is interested.

In Step 505, if the destination cell does not yet start to receive MBMS data, it is necessary for the destination cell to join in multicast group to receive MBMS. The target ENB transmits the IMGP join-in command to the core network.

In Step 506, the destination cell transmits a "switch request response" message to the source cell. This message contains configuration on the radio resources allocated by the destination cell to the UE, including the configuration on the radio resources allocated by the destination cell for MBMS transmission.

In Step 507, the source cell transmits the switch command to UE. And the command contains such configuration on radio resource allocation as the one on the radio resources allocated by the destination cell for MBMS transmission.

In Step 508, UE transmits a "switch complete" command to the destination cell.

Embodiment 4 of present invention is shown in FIG. 6. The detail is given with reference to this figure. Detailed technical description which is well known is omitted.

In Step 601, UE implements the measurement process according to the measurement information sent from ENB. The options of UE are illustrated in FIGS. 7 through 10. According to the illustration of operations, if it is necessary for UE to enter into the active state, the UE transmits the message 601 and the RRC connection request, including the identifier of UE, the identifier of PLMN, the capability of UE, and reason for establishment. Optionally, this message contains the MBMS measurement result, which is measured according to the measurement information of the MCCH broadcast. For example, the information of the MCCH broadcast is to measure the energy of the MBMS data channel or control channel. Then the measurement result contains the measurement of the data channel or control channel. Optionally, this message contains an indicator, indicating that the reason for the establishment of RRC connection is that the measured signal is lower or higher than the threshold.

In Step 602, ENB transmits an "RRC connection configuration" message. This message contains the configurations on the radio resources and the configurations on measurement.

In Step 603, UE transmits an "RRC connection complete" message. Optionally, this message contains the MBMS measurement result, which is measured according to the measurement information of the MCCH broadcast. For example, the information of the MCCH broadcast is used to measure the energy of the MBMS data channel or control channel. Then the measurement result contains the measurement of the data channel or control channel. Optionally, this message contains an indicator, indicating that the reason for the establishment of RRC connection is that the measured signal is lower or higher than the threshold.

In Step 604, the source cell transmits the "measurement control" information to the UE.

In Step 605, UE transmits a "measurement report" message to ENB.

In Step 606, the source cell determines to transmit the "switch request" message to the destination cell according to the measurement report from UE. This message contains the identifier of the UE, and the identifier of the MBMS service that UE joins in.

In Step 607, if the destination cell does not yet start to receive MBMS data, it is necessary for the destination cell to join in multicast group to receive MBMS. The target ENB transmits the IMGP join-in command to the core network.

In Step 608, the destination cell transmits the "switch request response" message to the source cell. This message contains configuration on the radio resources allocated by the destination cell to the UE including the configuration on the radio resources allocated by the destination cell for MBMS transmission.

In Step 609, the source cell transmits the switch command to UE. And the command contains configuration on radio resource allocation including the configuration on the radio resources allocated by the destination cell for MBMS transmission.

In Step 610, UE transmits a "switch complete" command to the destination cell.

FIG. 7 shows an example 1 of an operation of UE in present invention.

In Step 701, UE receives information of the MBMS control channel and saves it. The information through the control channel contains the identifier of the MBMS service, the configuration on radio resources, information of adjacent cells, and the measurement information.

Information of adjacent cells contains the attribute of adjacent cells, the information (e.g., the identifier of the applied primary scramble code) on the code for uniquely distinguishing the adjacent cell.

The measurement information contains the indicator of the channels to be measured, the parameters to be measured, and the threshold with which to determine whether UE enters the connection mode or not. If it is required to measure the power of MCCH, then UE measures the MCCH, and compares the measurement result with the threshold to judge whether it moves to the edge of the cell or not.

In Step 702, UE measures MCCH, and compares the measurement result with the threshold. If the measurement result (e.g., the power) is lower than the threshold, UE determines that it has arrived at the edge of the cell. Then step 704 is implemented; otherwise, MCCH is measured. In step 704, UE listens to the signals from adjacent cells and measures the adjacent cells. When the UE is measuring the adjacent cells, it can firstly read the synchronization channel of the adjacent cells. The primary scramble code applied in an adjacent cell is on the synchronization channel. Also, the primary scramble code of the adjacent cell can be obtained by measuring the pilot channel of the cell.

In Step 705, UE has saved the corresponding relationship between the primary scramble code for the adjacent cell and the cell attribute. With this relationship, it determines that whether the adjacent cell is a common cell or not. If yes, 707 UE initiates the uplink signaling (e.g., the RRC connection establishment request message), then ENB transmits the RRC connection response message to allow UE to be in the active state. This process utilizes the signaling of switching from idle to active. The sequent process is described in embodiment 3 and embodiment 4. If an adjacent cell is not a common cell but a cell within the coverage of SFN, UE keeps in idle state.

Figure 8:
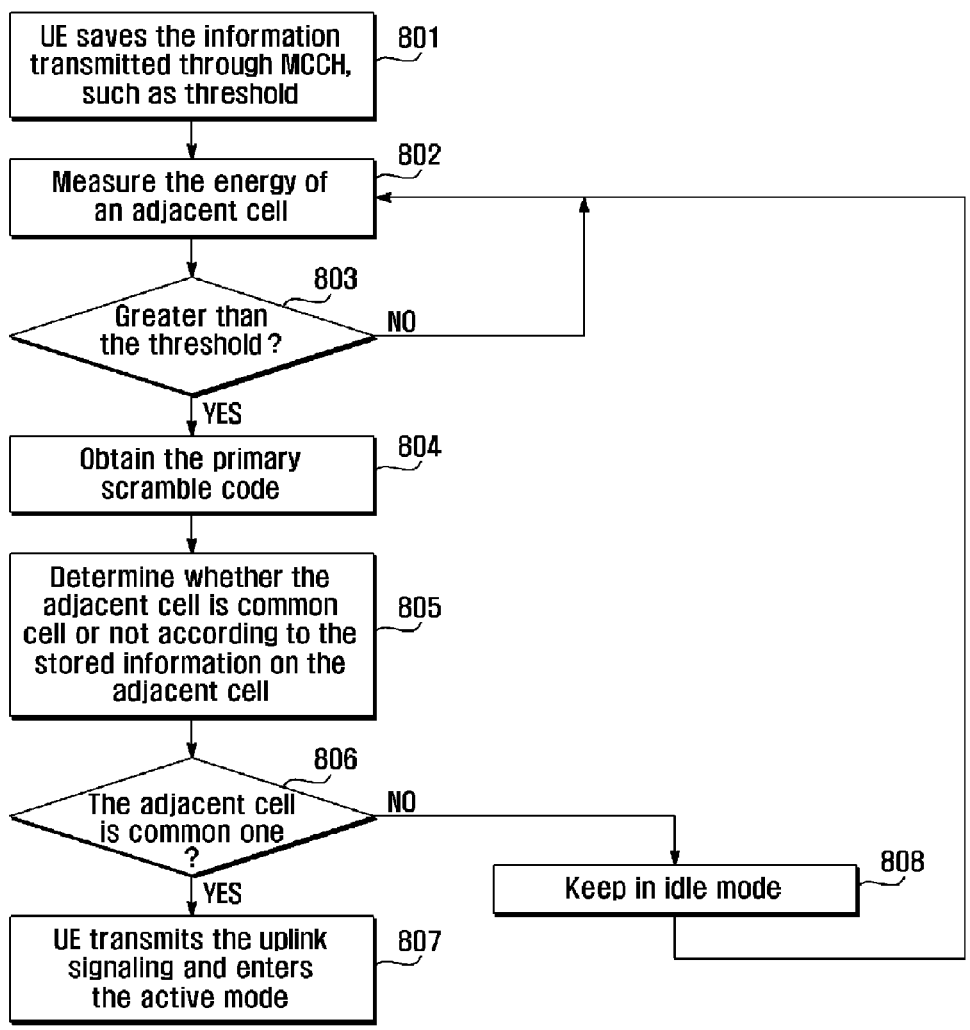
FIG. 8 shows an example 2 of an operation of UE in present invention.

FIG. 8 shows an example 2 of an operation of UE in present invention.

In Step 801, UE receives information on the MBMS control channel and saves it. The information through the control channel contains the identifier of the MBMS service, the configuration on radio resources, information of adjacent cells, and the measurement information.

Information of adjacent contains the attribute of adjacent cells, the information (e.g., the identifier of the applied primary scramble code) on the code for uniquely distinguishing the adjacent cell.

The measurement information contains the indicator of the channels to be measured, the parameters to be measured, and the threshold with which to determine whether UE enters the connection mode or not. If it is required to measure the power of pilot channel for adjacent cell, then UE measures the power of the pilot channel for adjacent cell, and compares the measurement result with the threshold to judge whether it moves to the edge of the cell or not. If the measurement result is greater than the threshold, it means that the UE has arrived at the edge of the cell.

In Step 802, UE measures the channels of adjacent cell, and compares the measurement result with the threshold. If the measurement result (e.g., the power) is greater than the threshold, UE determines that it has arrived at the edge of the cell. Then it goes to step 804; otherwise, it goes on to measure the channel for adjacent cell. In step 804, UE listens to the signals from adjacent cells and measures the adjacent cells. When it is measuring the adjacent cells, it can firstly read the synchronization channel of the adjacent cells. The primary scramble code applied in an adjacent cell is on the synchronization channel. Also, the primary scramble code of the adjacent cell can be obtained by measuring the pilot channel of the cell.

In Step 805, UE has saved the corresponding relationship between the primary scramble code of adjacent cell and the cell attribute. With this relationship, it determines whether the adjacent cell is a common cell or not. If yes, in 807 UE initiates the uplink signaling (e.g., the RRC connection establishment request message), then ENB transmits the RRC connection response message to allow UE to be in the active state. This process utilizes the signaling of switching from idle to active. The sequent process is described in embodiment 3. If an adjacent cell is not a common cell but a cell within the coverage of SFN, in 808 UE keep in idle state.

Figure 9:
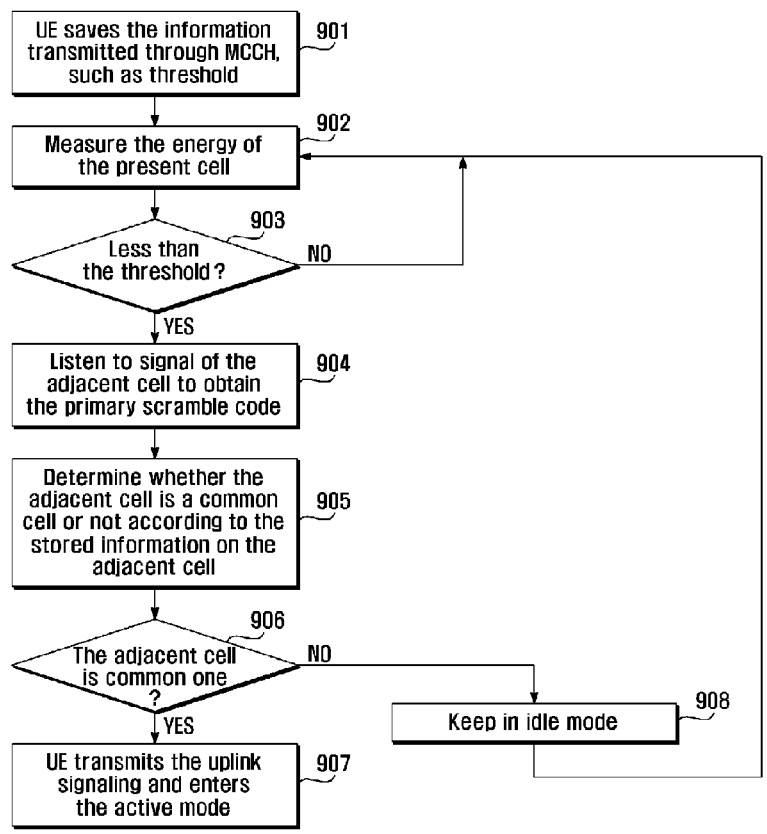
FIG. 9 shows an example 3 of an operation of UE in present invention.

FIG. 9 shows an example 3 of an operation of UE in present invention.

In Step 901, UE receives information on the MBMS control channel and saves it. The information through the control channel contains the identifier of the MBMS service, the configuration on radio resources, information of adjacent cells, and the measurement information.

Information of adjacent cells contains the attribute of adjacent cells, the information (e.g., the identifier of the applied primary scramble code) on the code for uniquely distinguishing the adjacent cell.

The measurement information contains the indicator of the channels to be measured, the parameters to be measured, and the threshold with which to determine whether UE enters the connection mode or not. If it is required to measure the power of pilot channel in adjacent cell, then UE measures the power of pilot channel in adjacent cell, and compares the measurement result with the threshold to judge whether it moves to the edge of the cell or not. If the measurement result is lower than the threshold, it means that the UE has arrived at the edge of the cell.

In Step 902, UE measures the channels in adjacent cells, and compares the measurement result with the threshold. If the measurement result (e.g., the power) is lower than the threshold, UE determines that it has arrived at the edge of the cell. Then it implements step 904; otherwise, it goes on to measure the pilot channel. In step 904, UE listens to the signals from adjacent cells and measures the adjacent cells. When the UE is measuring the adjacent cells, it can firstly read the synchronization channel of the adjacent cells. The primary scramble code applied in an adjacent cell is on the synchronization channel. Also, the primary scramble code of the adjacent cell can be obtained by measuring the pilot channel for the cell.

In Step 905, UE has saved the corresponding relationship between the primary scramble code of adjacent cell and the cell attribute. With this relationship, it judges whether the adjacent cell is a common cell or not. If yes, 907 UE initiates the uplink signaling (e.g., the RRC connection establishment request message), then ENB transmits the RRC connection response message to allow UE to be in the active state. The subsequent process is described in embodiment 3 and embodiment 4. This process utilizes the signaling of switching from idle to active. If an adjacent cell is not a common cell but a cell within the coverage of SFN, UE keep in idle state.

Figure 10:
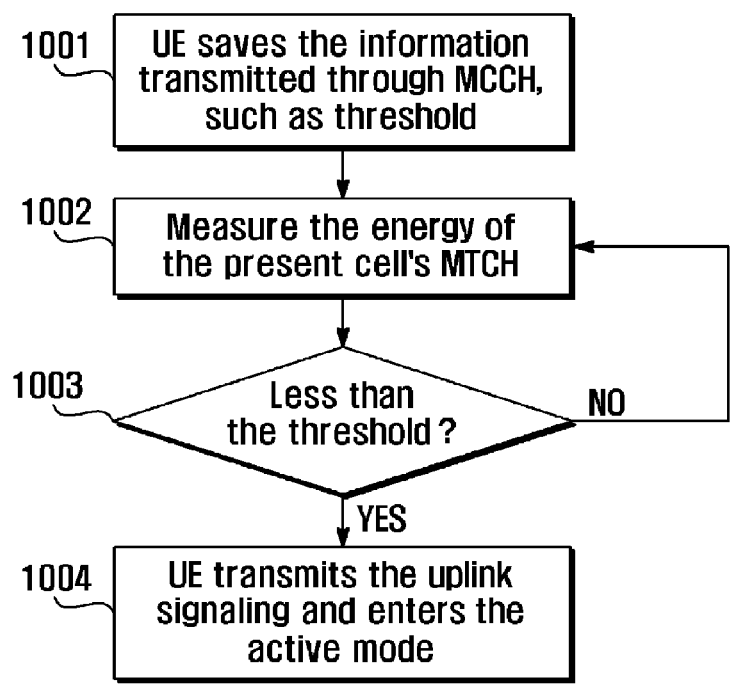
FIG. 10 shows an example 4 of an operation of UE in present invention.

FIG. 10 shows an example 4 of an operation of UE in present invention.

Step 1001, UE receives information on the MBMS control channel and saves it. The information through the control channel contains the identifier of the MBMS service, the configuration on radio resources, and the measurement information.

The measurement information contains the indicator of the channels to be measured, the parameters to be measured, and the threshold with which to determine whether UE enters the connection mode or not. If the threshold refers to the receiving power of the MBMS data channel or control channel for the cell, UE measures the receiving power of the MBMS data channel or control channel, and compares the measurement result with the threshold to determine whether it moves to the edge of the cell or not. If the measurement result is lower than the threshold, it means that the UE has arrived at the edge of the cell. No diversity gain exists in the area of an adjacent common cell. Therefore, the measured level of signal in this area is lower than that in an adjacent SFN cell. It is necessary to set an appropriate threshold to allow UE to be in the active state on condition that it is close to a common cell.

In Step 1002, UE measures the MBMS data channel or control channel for the cell, and compares the measurement result with the threshold. If the measured power is lower than the threshold, UE determines that it has arrived at the edge of the cell. Then it implements step 1004, i.e., UE initiates the uplink signaling (e.g., the RRC connection establishment request message), then ENB transmits the RRC connection response message to allow the UE to be in the active state. This process utilizes the signaling of switching from idle to active. It is described in embodiment 4. Otherwise, it turns to step 1002 and goes on to measure the MBMS data channel.

INDUSTRIAL APPLICABILITY

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

The invention claimed is:

1. A method for supporting continuous reception of enhanced broadcast service data at an Evolved Node B (ENB), the comprising:
   receiving a Multimedia Broadcast Multicast Service (MBMS) Session Start Request message, from a Multimedia Broadcast Multicast Service Coordination Entity (MCE), together with information of adjacent cells;
   broadcasting the information of the adjacent cells on a current cell; and
   transmitting MBMS control information on an MBMS Control CHannel (MCCH) of the adjacent cells, the control information including measurement information,
   wherein the measurement information contains control channels to be measured by a User Equipment (UE), parameters to be measured, and a threshold for determining whether the UE enters a connection mode.

2. The method according to claim 1, further comprising:
   receiving an uplink message, for requesting to enter a connection mode from a UE;
   transmitting a downlink message to the UE, enabling the UE entering into the connection mode;
   transmitting a switch request message to a destination cell;
   receiving a switch response message from the destination cell;
   transmitting a switch command to the UE; and
   receiving a switch complete message from the UE.

3. The method according to claim 1, further comprising:
   receiving, from the UE an uplink message, for requesting to enter a connection mode;
   transmitting a downlink message to the UE, enabling the UE entering into the connection mode;
   transmitting a measurement control command to the UE;
   receiving a measurement report from the UE;
   transmitting a switch request message to a destination cell;
   receiving a switch response message from the destination cell; and
   transmitting a switch command to the UE.

4. The method according to claim 1, wherein the information of adjacent cells contains an identifier of a unique scramble code for distinguishing the adjacent cells.

5. The method according to claim 1, wherein the information of adjacent cells contains an attribute of an adjacent cell.

6. The method according to claim 5, wherein the attribute of an adjacent cell contains an attribute of a common cell or a cell within coverage of a Single Frequency Network (SFN).

7. The method according to claim 1, wherein the threshold contains an energy threshold of an MCCH channel.

8. The method according to claim 1, wherein the threshold contains a threshold of pilot channel for the current cell.

9. The method according to claim 1, wherein the threshold contains a threshold of pilot channel for the adjacent cells.

10. The method according to claim 1, wherein the threshold contains a signal level threshold of MBMS data received in the current cell.

11. The method according to claim 1, further comprising:
calculating, by the UE, a level of an MCCH signal received in the current cell;
measuring, by the UE, signals from an adjacent cell to obtain a unique scramble code identifying the adjacent cell and obtaining an attribute of the adjacent cell with saved information;
initiatively transmitting, by the UE, if a measured level of the MCCH signal is lower than a threshold and the adjacent cell is a common cell, an uplink message and entering an active mode.

12. The method according to claim 1, further comprising:
measuring, by the UE, signals from an adjacent cell, if a level of the signals from the adjacent cell is higher than a threshold and the adjacent cell is a common cell; and
initiatively transmitting, by the UE, an uplink message and entering an active mode.

13. The method according to claim 1, further comprising:
measuring, by the UE, a level of signals from a pilot channel in the current cell; and
initiatively transmitting, by the UE, if the level of the signals from the pilot channel in the current cell is lower than a threshold and the adjacent cell is a common cell, an uplink message and entering an active mode.

14. The method according to claim 1, wherein if a level of signals from a pilot channel in the current cell is lower than a threshold, the UE initiatively transmitting an uplink message and entering an active mode.

15. A method for supporting reception of enhanced broadcast service data, the method comprising:
receiving, by a Multimedia Broadcast Multicast Service (MBMS) Coordination Entity (MCE) an MBMS Session Start Request message from a core network;
transmitting, by the MCE, after receiving the message, response message to the core network;
transmitting, by the MCE, the MBMS Session Start Request message to all cells within an initial Single Frequency Network (SFN) coverage, together with information for requesting an Evolved Node B (ENB) to count a number of User Equipments (UEs);
transmitting, by the ENB, an MBMS UE counting indicator on an MBMS Control CHannel (MCCH);
reporting, by the ENB, the number of UEs to the MCE; and
determining, by the MCE, an SFN range and attributes of each cell according to the number of UEs counted in each cell.

16. The method according to claim 15, further comprising:
transmitting, by the ENB, MBMS control information on the MBMS control channel, including information of adjacent cells, and measurement information.

* * * * *